US007865764B2

(12) United States Patent
Jester

(10) Patent No.: US 7,865,764 B2
(45) Date of Patent: Jan. 4, 2011

(54) REMOTE CHASSIS MONITORING SYSTEM

(75) Inventor: Scott A. Jester, Lakeville, MN (US)

(73) Assignee: Rackmaster Systems, Inc., Shakopee, MN (US)

( * ) Notice: Subject to any disclaimer, the term of this patent is extended or adjusted under 35 U.S.C. 154(b) by 1375 days.

(21) Appl. No.: 10/658,508

(22) Filed: Sep. 9, 2003

(65) Prior Publication Data

US 2008/0082867 A1    Apr. 3, 2008

Related U.S. Application Data

(60) Provisional application No. 60/415,180, filed on Oct. 1, 2002.

(51) Int. Cl.
*G06F 11/00* (2006.01)

(52) U.S. Cl. .............................. 714/4; 714/48; 714/57; 709/224

(58) Field of Classification Search ........................ None
See application file for complete search history.

(56) References Cited

U.S. PATENT DOCUMENTS

| 5,123,017 | A  | * | 6/1992  | Simpkins et al. | 714/26  |
|-----------|----|---|---------|-----------------|---------|
| 6,023,507 | A  | * | 2/2000  | Wookey          | 709/224 |
| 6,651,190 | B1 | * | 11/2003 | Worley et al.   | 714/43  |
| 6,697,962 | B1 | * | 2/2004  | McCrory et al.  | 714/27  |
| 6,714,976 | B1 | * | 3/2004  | Wilson et al.   | 709/224 |
| 7,117,239 | B1 | * | 10/2006 | Hansen          | 709/200 |
| 7,120,819 | B1 | * | 10/2006 | Gurer et al.    | 714/4   |
| 7,421,623 | B2 | * | 9/2008  | Haugh           | 714/47  |
| 2002/0120886 | A1 | * | 8/2002 | Nguyen et al. | 714/39 |
| 2004/0030778 | A1 | * | 2/2004 | Kronenberg et al. | 709/224 |
| 2004/0064547 | A1 | * | 4/2004 | Guillemin     | 709/224 |
| 2010/0011246 | A1 | * | 1/2010 | Ly            | 714/25  |

OTHER PUBLICATIONS

Microsoft Computer Dictionary 4th Ed. Microsoft Press, 1999, p. 379.*

* cited by examiner

*Primary Examiner*—Christopher S McCarthy
(74) *Attorney, Agent, or Firm*—Moss & Barnett

(57) ABSTRACT

In a system for monitoring remote computing stations, each remote station includes an array of detectors and a controller configured to receive the detector signals. The controller causes a condition information generator to generate condition records including multiple condition information entries, each entry corresponding to one of the detector outputs. A monitoring station is adapted to send cues to the remote stations, and each station responds to a cue by presenting its condition record as a web page for retrieval by the monitoring station. The monitoring station sends the cues to stations in a sequence controlled by a user of the monitoring station, or alternatively, in a rapid and repeated sequence according to a station selection program written in Java or another universal language. The program generates interlocked instruction sets designed to recognize, as an error, a failure to connect with a remote station. The system incorporates a comparator function for matching each condition information entry with an acceptance standard, and generating a fault indication if the entry fails to satisfy the standard.

35 Claims, 8 Drawing Sheets

138

IP Address: 128.1.1.20

Location: Bldg. 220

Power Supply 1  
PASS

Power Supply Fan  
PASS

Motherboard Fan 1  
FAIL 1900 RPM

Motherboard Fan 2  
PASS 2200 RPM

Motherboard Fan 3  
PASS 2200 RPM

Drive Bay Temp  
PASS

Motherboard Mount Temp  
PASS

*FIG. 5*

REMOTE CHASSIS MONITORING SYSTEM

This application claims the benefit of priority based on Provisional Application No. 60/415,180 entitled "Remote Chassis Monitoring System," filed Oct. 1, 2002.

BACKGROUND OF THE INVENTION

The present invention is concerned with monitoring conditions at remote chassis or computing stations, and more particularly with systems designed for individual, approximately real-time monitoring of multiple computing stations in an information processing network.

In organizations that depend on the efficient processing and transfer of information, the networking of multiple computers is a common practice. Networking considerably enhances the capacity of each computer on the system, by enabling a rapid transfer of information among the system computers, and by enabling the system computers to share operating programs and other tools used to process system information. As computer networks become increasingly sophisticated and complex, the interdependence among the network computers increases as well, underlining the need for effective monitoring of each chassis or computing station in the network.

In networks that are sufficiently compact, such as those located within a single building or floor of a building, monitoring by direct inspection of the computing stations may be sufficient. Direct inspection can be enhanced by a liquid crystal display (LCD) at each computing station visually indicating status information, or by a visible or audio alarm generated in response to determining fault conditions.

However, in the case of wide area networks (WAN) or networks of computers linked via the Internet, the computing stations of the network typically are separated from one another by distances that render direct inspection costly and inefficient. One known technique for monitoring remote computing stations employs a modem under the control of the computing platform being monitored. However, this involves an added expense of maintaining a telephone connection dedicated to the remote, monitored location, and functions well only when the computer platform being monitored is operative.

A variety of approaches are known for monitoring remote computing devices. U.S. Pat. No. 6,044,476 and No. 5,815,652, issued to Ote, et al., describe a management system for monitoring and controlling the performance of computers on a network in a server system. A server processor board includes a processor independent from the managed computer for monitoring faults in the managed computer and controlling power to the managed computer. A fault detected in the managed computer results in a message sent to the managing computer and a resulting display at the managing computer. The system contemplates coupling to a managing computer either over a local area network (LAN) or a public line.

U.S. Pat. No. 6,411,678 (Tomlinson, Jr., et al.) discloses a diagnostic center and remote stations that form a wide area network (WAN). Each remote station, according to a schedule or responsive to an alarm condition, initiates a telephone communication to a "point-of-presence" server, which can be an internet services provider. Fault data are transferred to the server, and later are retrieved from the server by a diagnostic center. In an alternative approach, the diagnostic center uses a pager to prompt the remote station to initiate the telephone communication.

U.S. Pat. No. 6,703,255 (Nouri, et al.) features a server that includes a self-contained microcontroller network that monitors and manages the physical environment, regardless of the operational status of the server. Software remote from the server allows a system administrator to query the server status, even when the server is down.

The preceding examples notwithstanding, there is a need for a more reliable system for obtaining virtually real-time status information about each chassis or computing station in a multiple computer network. The system should be operable regardless of the specific platforms and operating systems at the individual computing stations, at minimal cost, and with minimal interference with the routine exchange and processing of data throughout the network. Further, the system should be capable of providing status information concerning a chassis or computing station, even in the event of a failure of that chassis or station.

SUMMARY OF THE INVENTION

To meet the foregoing needs, there is provided a system for monitoring conditions at a plurality of computing stations remote from a monitoring station, wherein each computing station includes a primary processor and a chassis housing the primary processor. The system includes a plurality of detector arrays, each located at a different one of a plurality of computing stations. Each detector array includes at least one detector adapted to sense a condition at the associated computing station and generate a detector signal indicating the sensed condition. The system further includes a plurality of controllers, each located at an associated one of the computing stations. Each controller is operatively coupled to the associated detector array to receive the detector signal from each detector of the associated array, and generate a condition signal corresponding to each received detector signal. The system includes a plurality of condition information generators, each located at an associated one of the computing stations. Each condition information generator is coupled to receive its associated condition signal, and to generate condition information including a condition information entry based on each received condition signal. A computing station memory at each computing station is adapted to receive the associated condition information. The memory includes a first memory sector for storing address information identifying the associated computing station, and a second memory sector for dynamically storing the associated condition information. Each condition information generator further is adapted to present a condition record including the address information and the condition information for retrieval by a monitoring station, in response to receiving a cue from the monitoring station. The system also includes a monitoring station remote from the computing stations and communicatively coupled to the computing stations. The monitoring station includes a monitoring station processor, a selection component for individually selecting different ones of the computing stations, a monitoring component for generating cues and sending the cues to the selected computing stations, a monitoring station memory including a first memory segment for storing computing station address information and a second memory segment for storing condition records presented in response to the cues and retrieved by the monitoring component, and an image generator associated with the monitoring station memory for generating visible images of the condition records.

This system facilitates a rapid and repeated monitoring of remote computing stations in real time. The system is functional, even when one of the monitored computing stations is down. The system can be independent of the configurations of particular monitored computing stations. Finally, the system can be implemented at relatively low cost, by using the internet or other shared or mutual communications linkage.

Each controller (typically a microcontroller) can be built into its associated computer chassis, but functions independently of the primary computer in the chassis. A variety of sensors in the chassis provide inputs to a chassis monitoring system governed by the microcontroller, providing status information on parameters such as temperatures, power supply voltages, and cooling fan speeds. The status information can be provided to an LCD on the front of the chassis.

Further, the status information is provided to a web engine in the chassis, configured to generate a web page containing the status information when queried by an external source.

At least one of the computing stations of the network, i.e. the monitoring station or local station, incorporates a computer program for selectively monitoring the other computing stations. In one form of the network, the monitoring program includes a web browser. A user at the monitoring station enters the internet protocol (IP) address of the chassis of interest. Then, via the web browser the monitoring station gains access to the web page associated with the chassis of interest, retrieves the web page and displays it to the user at the monitoring station. To monitor other remote stations on the network, the user at the monitoring station simply enters the corresponding IP addresses to retrieve the associated web pages.

According to an alternative version of the system, the monitoring program at the local station is configured to sequentially query multiple remote stations for chassis status information. The user at the monitoring station inputs the IP addresses of the stations of interest, after which the monitoring program operates automatically to query each of the remote stations, without further operator input. The monitoring program operates in the background, and thus does not interfere with the use of the local computer or station for routine data operations and transmissions. The monitoring program preferably is written in a general or universal language that allows its use in conjunction with different operating systems. Specifically, a Java language program is preferred, because it can be run on any type of computer and operating system, if a Java run-time environment has been installed in the system.

So long as the queries by the monitoring system result in no errors found, the monitoring program is transparent to the user at the monitoring station. When an error is found, the user is notified, e.g. by an audio alarm or by a pop-up window at the video terminal of the monitoring station. The pop-up window may include the complete web page associated with the remote station reporting the error, but more preferably includes only the IP address and/or other identification of the chassis reporting the error condition, along with a list of the malfunctions found.

Another aspect of the invention, implemented in a network of computing stations, is a monitoring station for tracking conditions at the other computing stations in the network. The monitoring station includes a monitoring station processor, and a selector for determining a set of remote computing stations to be monitored from a monitoring station that includes the monitoring station processor. A monitoring component is operably associated with the selector, and is adapted to send cues in a sequence to the selected remote computing stations. This causes each selected computing station to generate a condition record including computing station address information and condition information indicating at least one sensed condition at the computing station, and further causes each selected computing station to present the condition record for retrieval by the monitoring station. The monitoring component is further adapted to retrieve the condition records presented by the computing stations. The monitoring station has a monitoring station memory including a first memory segment for storing a list of addresses individually identifying the remote computing stations. A second memory segment of the memory stores the condition records retrieved from the selected remote computing stations. The monitoring station processor is adapted to generate a warning in response to receiving a condition record with a fault indication. The monitoring component and the selector are configured to operate transparently to the user of the monitoring station until the processor generates a warning.

Because the computing station selecting and monitoring functions operate in the background, they do not interfere with use of the monitoring station processor for other functions. In fact, a user of a computer at the monitoring station may be unaware of ongoing monitoring, until a warning is issued. Typically, the warning takes the form of a visible image of a retrieved condition record, which includes an indication of the detected fault.

Another aspect of the present invention is a self-monitoring computing station. A primary processor is disposed at the computing station. A detector array at the computing station includes at least one detector adapted to sense a condition at the computing station and generate a detector signal including the sensed condition. A controller is coupled to receive the detector signal from each detector of the array, and is adapted to generate a condition signal corresponding to each detector signal. A condition information generator is coupled to receive each condition signal, and is adapted to generate condition information including a condition information entry based on each received condition signal. A memory at the computing station includes a first memory sector for storing address information identifying the computing station, a second memory sector for dynamically storing the condition information, and a third memory sector for storing an acceptance standard corresponding to each condition information entry. A comparator is coupled to the second and third memory sectors, and is adapted to compare each condition information entry with its corresponding acceptance standard, and generate a fault indication responsive to each failure of a condition information entry to satisfy the corresponding acceptance standard. The condition information generator further is adapted to present a condition record including the address information and the condition information for retrieval by a remote monitoring station, in response to receiving a cue from the monitoring station.

A salient feature of self-monitoring computing stations, in accordance with this invention, is that apart from the need to receive a cue from the monitoring station to present condition records, they operate independently of the main processor. Accordingly, there is no need to configure the self-monitoring station in accordance with a monitoring station configuration, nor is there a need for a shared protocol. Further, ongoing, virtually real time monitoring proceeds in the self-monitoring computing station, or in multiple such stations in a network, without imposing a burden on the monitoring processor.

A further aspect of the present invention is a process for monitoring conditions at a plurality of remote computing stations, including the following steps:

a. providing a detector array at each of a plurality of remote computing stations, and using each detector of each array to sense a condition at the associated station;

b. using a controller at each station to receive a detector signal from each detector of the associated array, and to generate a condition signal corresponding to each detector signal;

c. generating condition information at each computer station including a condition information entry corresponding to each condition signal;

d. assembling the condition information at each station, along with address information identifying that station, into a condition record associated with that station;

e. sending a cuing signal from a monitoring computer to each of the remote computing stations;

f. responsive to receiving the cuing signal at each remote station, presenting the condition record associated with that station for retrieval by the monitoring computer; and g. using the monitoring computer to retrieve the presented condition records.

Further according to this aspect of the invention, the monitoring program initiates the cues or queries to the remote stations in sequence by generating a series of substantially independent instruction sets, known as program fragments or threads. Each of the threads is uniquely associated with one of the IP addresses. In conjunction with the attempt to establish communication with its associated chassis, each thread generates two additional, interlocked threads: a first thread directed to establishing communication with the associated chassis to retrieve the associated web page; and a second thread configured to time the connection attempt. More particularly, should the first thread fail to lead to communication with the associated chassis within a predetermined time or predetermined number of repeated attempts in accordance with the second thread, both threads or sets of instructions terminate and an error message is generated. Meanwhile, the threads associated with the other computing stations on the network are executed independently of the threads associated with the error message.

The monitoring system uses an existing TCP/IP network connection to provide a convenient and inexpensive communication link, regardless of whether the connection is over a local area network, over a wide area network, or over the Internet. Although generally less preferred, the system can employ a direct connection among network computers as well. Status information with respect to each chassis is maintained by a monitoring system governed by a microcontroller independently of the principal computing function at the chassis. As an option, the system can incorporate out-of-band monitoring in which the queries from the monitoring station and the web pages from the monitored stations are transmitted over an interconnection separate from the network interconnection used for primary data and program transmissions. This enables the monitoring system to function even if the primary communication channels are down.

With respect to each chassis, configuring the monitoring program with a pair of interlocked threads advantageously resolves a failure to connect with the chassis after repeated attempts, by generating an error message. The attempts to communicate with the chassis are not allowed to proceed indefinitely. Rather, the failure to connect is recognized as an error.

With respect to the entire network, configuring the monitoring program to generate independent threads individually and uniquely associated with the monitored stations, prevents a failure to connect with a particular chassis from delaying or otherwise undesirably affecting the monitoring process with respect to the other chassis in the network.

BRIEF DESCRIPTION OF THE DRAWINGS

FIG. 5 illustrates an exemplary web page generated at one of the monitored computing stations;

DETAILED DESCRIPTION OF PREFERRED EMBODIMENTS

Figure 1:
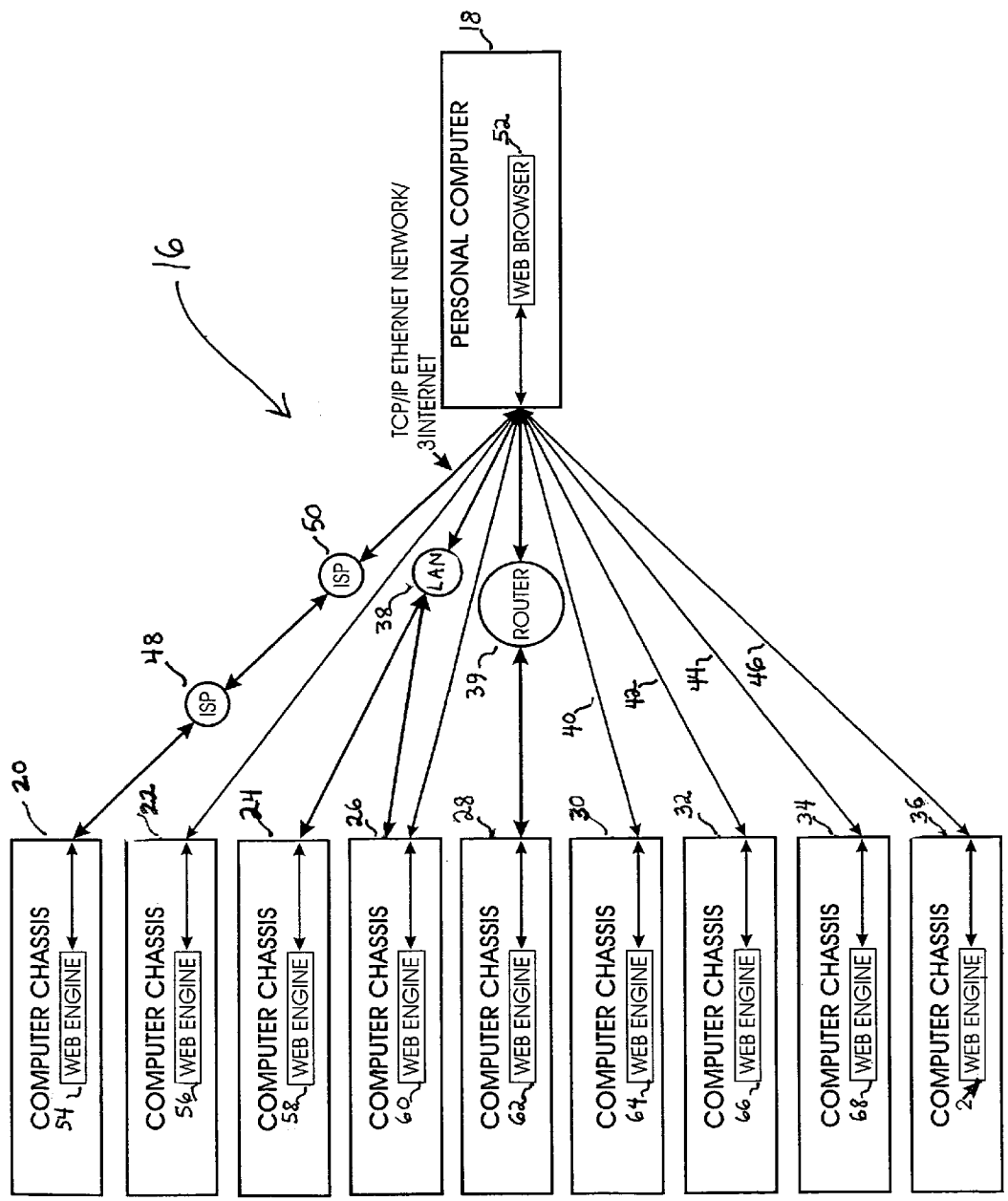
FIG. 1 is a block diagram of a network of chassis or computing stations monitored through use of a web browser at one of the stations.

Turning now to the drawings, there is shown in FIG. 1 an information processing network 16 including multiple computers or computing stations, one of which is a monitoring station 18. The remaining computing stations, shown as computer chassis 20-36, are monitored by station 18. The monitoring station can be a personal computer. Chassis or stations 18 and 20-36 are interconnected over a TCP/IP (transmission control protocol/internet protocol) network connection. Several interconnection modes are illustrated: a local area network (LAN) in which computer 18 and computing stations 24 and 26 are coupled to a hub 38; a wide area network (WAN) in which chassis 28 and computer 18 are coupled to a router indicated at 39; direct links 40-46 between computer 18 and chasses 30-36; and an Internet connection involving two Internet service providers (ISPs) 48 and 50 as intermediaries between computing station 20 and computer 18.

It is to be appreciated that these alternatives are shown in the single network of FIG. 1 for convenience. In actual practice, networks such as network 16 can employ several of the illustrated approaches, or a single approach, such as a single hub, router, or ISP. In any event, the interconnection facilitates the transfer of working data, operating programs and other digital information among the computing stations.

There is an increasing tendency among computer users to configure multiple computers or computing stations into networks, which enhance the utility of each computer by facilitating the sharing of working data and operating programs among the computers of the network. As users continue to rely more heavily upon more sophisticated and complex computer networks, there is an increasing need for a reliable means of monitoring computing stations throughout the network. Typically in the case of networks relying on the Internet and wide area networks, but also in the case of local area networks and direct connections, the computing stations are separated from one another by distances that render direct inspection impractical or prohibitively expensive. To address this problem, personal computer 18 and computer chassis 20-36 are configured to facilitate remote, virtually real-time monitoring of the condition or status of each computer chassis. As seen in FIG. 1, personal computer 18 is provided with a web browser 52, i.e. a computer program capable of establishing a connection with any one of computing stations 20-36 in response to instructions from the user of computer 18. Computing stations 20-36 incorporate respective web engines 54-70, each configured to generate a web page displaying chassis condition or status information, in response to receipt of a cue or query from computer 18 over the network interconnection.

Figure 2:
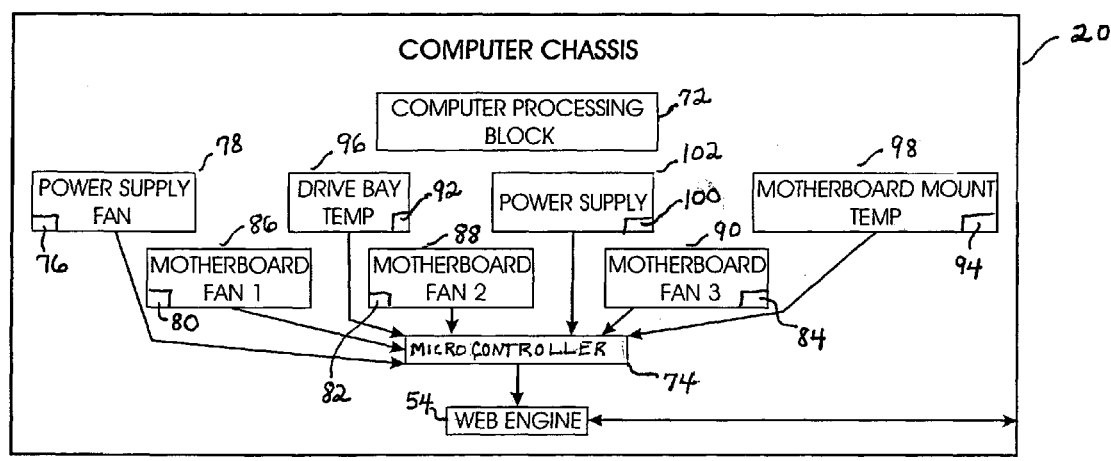
FIG. 2 is a more detailed diagram of one of the monitored chassis or computing stations shown in FIG. 1.

FIG. 2 schematically illustrates computer chassis 20 in greater detail. Chassis 20 houses a computer processing block 72, which for convenience can be considered as the primary processor at this computing station for receiving, processing and transmitting system working data in the normal or routine operation of the computer system. Chassis 20 further incorporates a local condition monitoring system including a microcontroller 74 that operates independently of primary processor 72, and contains its own operating software programs independent of the programs residing in the primary processor.

The monitoring system, more specifically microcontroller 74, receives inputs from an array of detectors located throughout computer chassis 20. For example, a tachometer 76 measures the speed (rpm) of a fan 78 located near the power supply. Additional tachometers 80, 82 and 84 measure the respective speeds of fans 86, 88 and 90 located near the motherboard of the primary processor. Temperature sensors 92 and 94 are mounted at two locations in chassis 20 to measure the drive bay temperature as indicated at 96, and the motherboard mount temperature as indicated at 98. Finally, a detector 100 is coupled to a power supply 102, to sense whether the power supply is operating within a predetermined normal voltage range. This can be an analog detector that directly measures voltage, or a digital detector incorporating TTL (transistor transistor logic) circuitry.

Preferably, all of the detectors are continually or repeatedly polled by the monitoring system microcontroller. Responsive to these inputs, microcontroller 74 provides an input to web engine 54 indicating the status of the chassis, i.e. indicating the conditions reported by the various detectors in the chassis. Web engine 54 acts as a web page server, and in response to a query from computer 18, overlays the chassis status information on a web page which is sent to computer 18 via the network interconnection.

Figure 3:
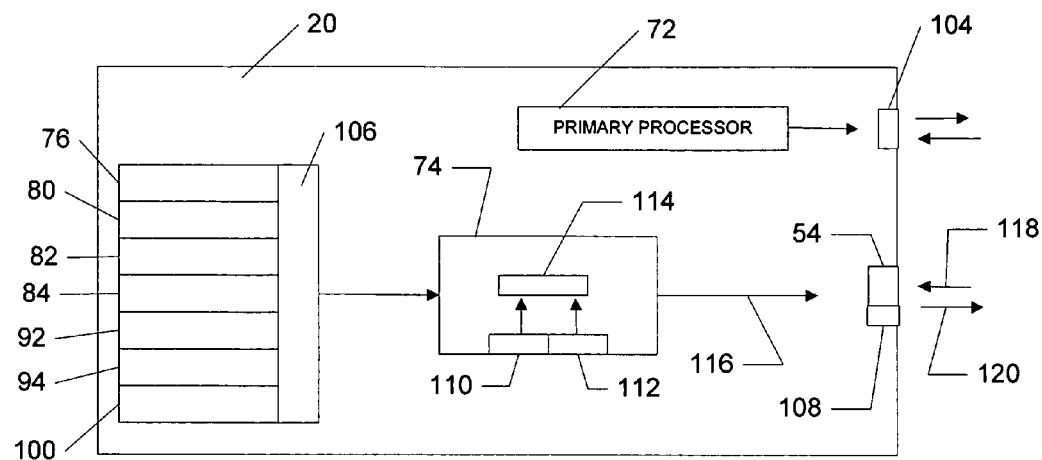
FIG. 3 is another detailed diagram of the monitored computing station, showing features used in generating condition records for retrieval by a monitoring station.

FIG. 3 is another schematic view of computing station 20. As seen in this figure, the primary processor is coupled to an interface 104 for transmitting data to other computing stations on the network, including monitoring station 18, and for receiving information from the other computing stations. The various temperature, power level and fan speed detectors provide a detector array 106. The output of the detector array, consisting of several detector signals (seven in this case), is provided to controller 74. The controller includes a memory with several sets of registers devoted to the monitoring function. A first sector or set of registers 108 in the web page server stores address information identifying the particular computing station, i.e. station 20. A second set of registers 110 in controller 74 is configured to dynamically store condition information associated with station 20, i.e. the detector signals. A third memory sector or set of registers 112 in the controller stores seven acceptance standards, each individually associated with one of the detectors.

Controller 74 further includes a comparator 114 coupled to memory sectors 110 and 112. Comparator 114 comprises a computer program for comparing each detector signal with its associated acceptance standard. In each case, the detector output and associated acceptance standard are compared, to determine whether the detector output satisfies the acceptance standard. If the detector output corresponding to a given detector fails to meet the acceptance standard, comparator 114 generates a fault indication for the condition sensed by the detector involved.

As indicated at 116, controller 74 provides its output to web engine 54. In particular, the controller generates seven condition signals, each associated with one of the detectors. Web engine 54 functions as a condition information generator, by generating a condition record associated with its computing station. The condition record includes the address information that identifies station 20, and the condition information entries, in this case seven entries corresponding to the seven detectors involved.

The address information remains constant. However, because memory sector 110 dynamically stores the detector signals, the condition record is continually updated in accordance with the most recent detector signals. In response to receipt of a cue from monitoring processor 18 as indicated at 118, web engine 54 generates the condition record in the form of a web page, for retrieval by the monitoring station as indicated at 120.

Monitored computing stations 22-36 incorporate monitoring systems similar to that just described for computing station 20. If desired, additional parameters can be monitored, e.g. humidity and barometric pressure. The monitoring system also may incorporate pressure-sensitive or light-sensitive detectors to sense an attempt to tamper with any of the chassis.

Figure 4:
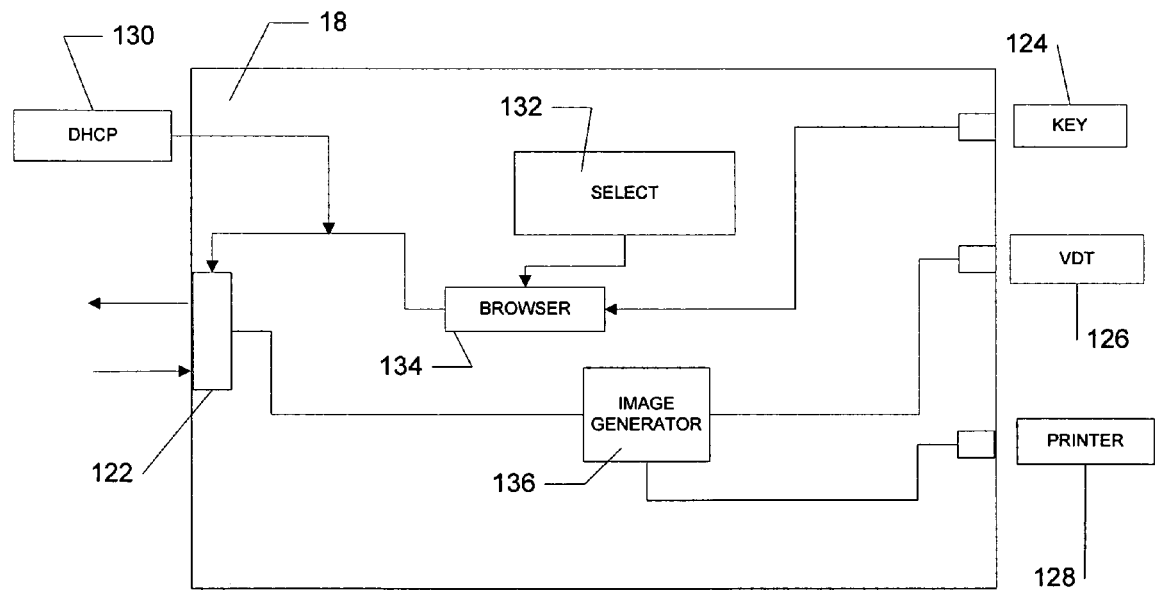
FIG. 4 is a more detailed diagram of the monitoring station of the network.

Monitoring station 18 is shown schematically in FIG. 4. The monitoring computer includes an interface 122 for receiving information from the monitored computing stations, and for providing information to selected computing stations. Several peripheral devices are coupled to the monitoring computer, including a keyboard 124, a video display terminal 126, and a printer 128. A dynamic host configuration protocol (DHCP) server 130 can reside in computer 18, or can reside in router 39, an ISP (48, 50), or even one of computing stations 20-36. As a further alternative, the DHCP is resident in several of these components. Server 130 is used to assign respective internet protocol addresses to the monitored computing stations. Computer software programs resident in computer 18 include a computing station selection program 132, a web browser 134, and an image generator 136. The computing stations can be monitored manually by entering their IP addresses using keyboard 124. As an alternative, selection program 132 can be used to sequentially query all computing stations on the network, or a selected set of the computing stations.

Web pages retrieved by monitoring computer 18 are provided to image generator 136, which then is operable to produce images of the web pages on terminal 126, cause printer 128 to generate printed copies of the web pages, or both.

The web page, indicated at 138 in FIG. 5, identifies chassis 20 by IP address and location, and displays the chassis status information. Status information is provided in the form of a condition record including seven condition entries, one for each detector. Of course, the number of condition entries increases and decreases with the number of detectors involved. With respect to each detector, the status information can include either a "pass" or "fail" indication, as seen for the power supply and temperature readings. Alternatively, as indicated in connection with the fan speed tachometers, the web page can augment the pass/fail indication with specific measured values. Thus, the web page indicates the failure of "motherboard fan 1," i.e. fan 86, and further indicates the reason for failure—that the fan is operating at less than an acceptable minimum rpm. While not illustrated, the power supply and temperature indications can be augmented with voltage level and temperature readings if desired.

As noted previously, the monitoring of computing stations 20-36 is accomplished through the existing Ethernet TCP/IP connection. This provides a convenient, inexpensive communication link for monitoring the status of each chassis, operable according to a common protocol regardless of any variance in platforms and operating systems among the computing stations of the network. Dynamic host configuration protocol (DHCP) server 130 can be used to assign respective IP addresses to the monitored stations according to any system convenient to the user, thus providing the flexibility to accommodate a wide variety of users.

The use of network 16 to monitor stations 20-36 proceeds as follows. The user at computer 18 initiates monitoring by entering the IP address of a selected chassis into computer 18, providing the selected address to web browser 134. Responsive to the IP address input, web browser 134 gains access to the selected computer chassis (e.g. chassis 20) via the network connection and provides a query or cue to web engine 54. In response to the cue, web engine 54 generates the web page reporting chassis status, and provides the web page to computer 18 via the network interconnection, whereupon the web page is displayed on video terminal 126 associated with computer 18 at the monitoring station. At this point the user can review the web page for any error indication. The process is repeated in accordance with the user's selection of different IP addresses and entry of these addresses into computer 18.

Figure 6:
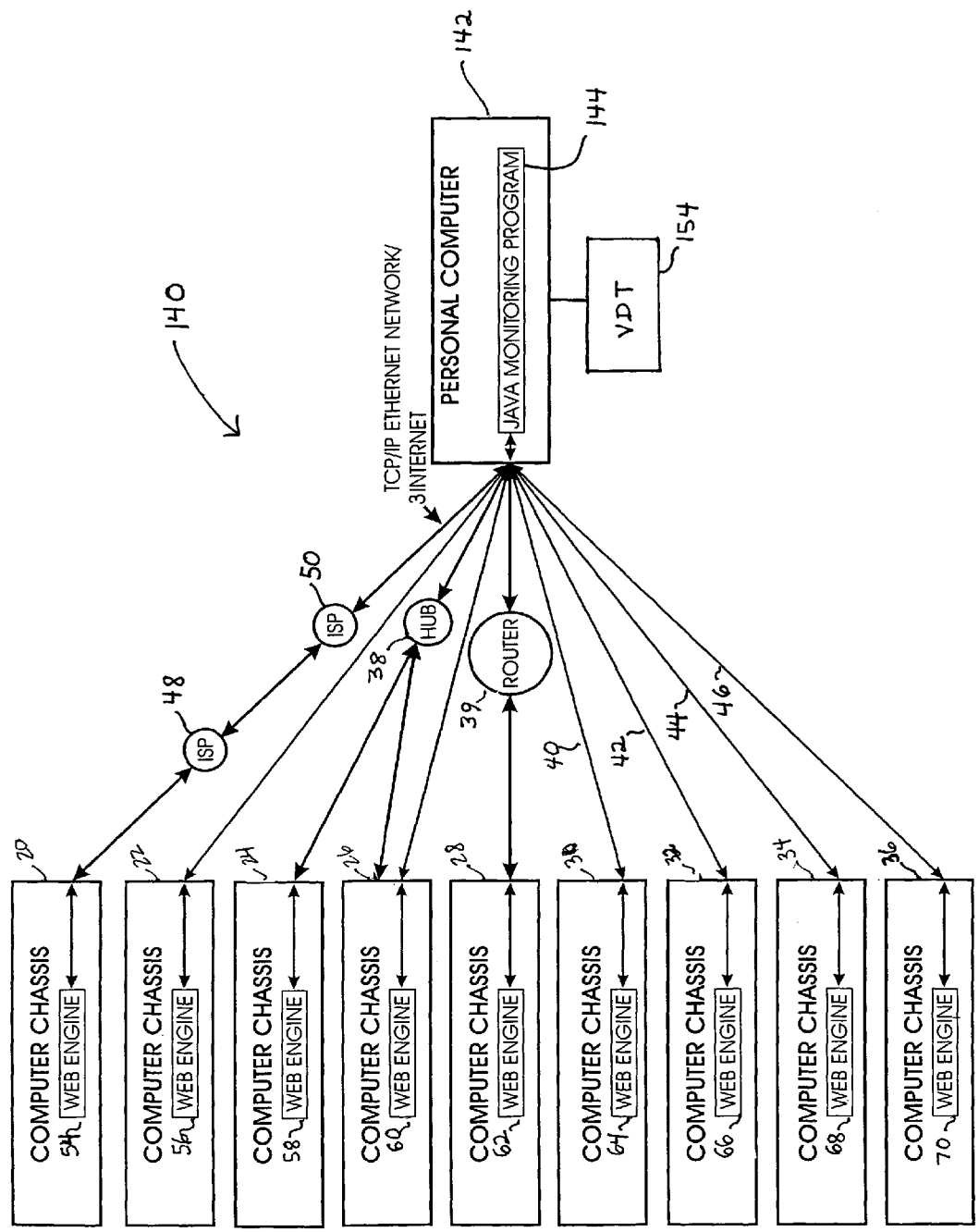
FIG. 6 is a block diagram of an alternative embodiment network similar to that shown in FIG. 1, monitored through use of a monitoring program at one of the computing stations.

FIG. 6 illustrates an alternative embodiment network 140, similar to network 16 in that multiple computer chassis or computing stations 20-36 are coupled to a monitoring station or computer 142 through a network featuring the same alternatives illustrated in FIG. 1. In a departure from network 16, computer 142 does not use a web browser to gain access to chassis status information. Instead, a monitoring program 144 resident in computer 142 is employed to automatically monitor computer stations 20-36 in a rapid sequence that approximates simultaneous monitoring, to provide virtually real-time information concerning the status of all monitored stations.

Monitoring program 144 is configured to operate in the background, independently of operations on working data, data transmissions and loading or transfer of operating programs that occur at computer 142 during normal use of the network. In other words, the monitoring program is transparent to the user. The monitoring program preferably is written in a general or universal language, e.g. the Java language as indicated in FIG. 6. As a result, the monitoring program can be run on any type of computer and operating system, so long as a Java run-time environment has been installed.

A network user initiates monitoring by entering into computer 142 a list of IP addresses corresponding to the chassis or stations 20-36 to be monitored, which in turn provides the IP address list to the Java monitoring program. Typically the list includes every chassis on the network, although the list can be limited to a selected subset of the computing stations if desired.

In either event, entry of the IP addresses initiates monitoring, which proceeds in a rapid and repeated sequence through the listed chassis or monitored stations. If no errors are found, the initial monitoring sequence and subsequent repetitions remain transparent to the user at computer 142.

According to one aspect of the present invention, monitoring program 144 is configured to allow the monitoring sequence to proceed rapidly, despite an error indication with respect to any one of the monitored stations. This result is achieved primarily by providing program instructions that initiate (i.e. cause computer 142 to initiate) monitoring of each chassis immediately after initiating monitoring of the preceding chassis in the sequence, rather than first requiring feedback from the preceding chassis. Secondly, the monitoring program instructions incorporate a feature that prevents the failure to connect with a chassis from introducing an indeterminate delay into the monitoring sequence.

Figure 7:
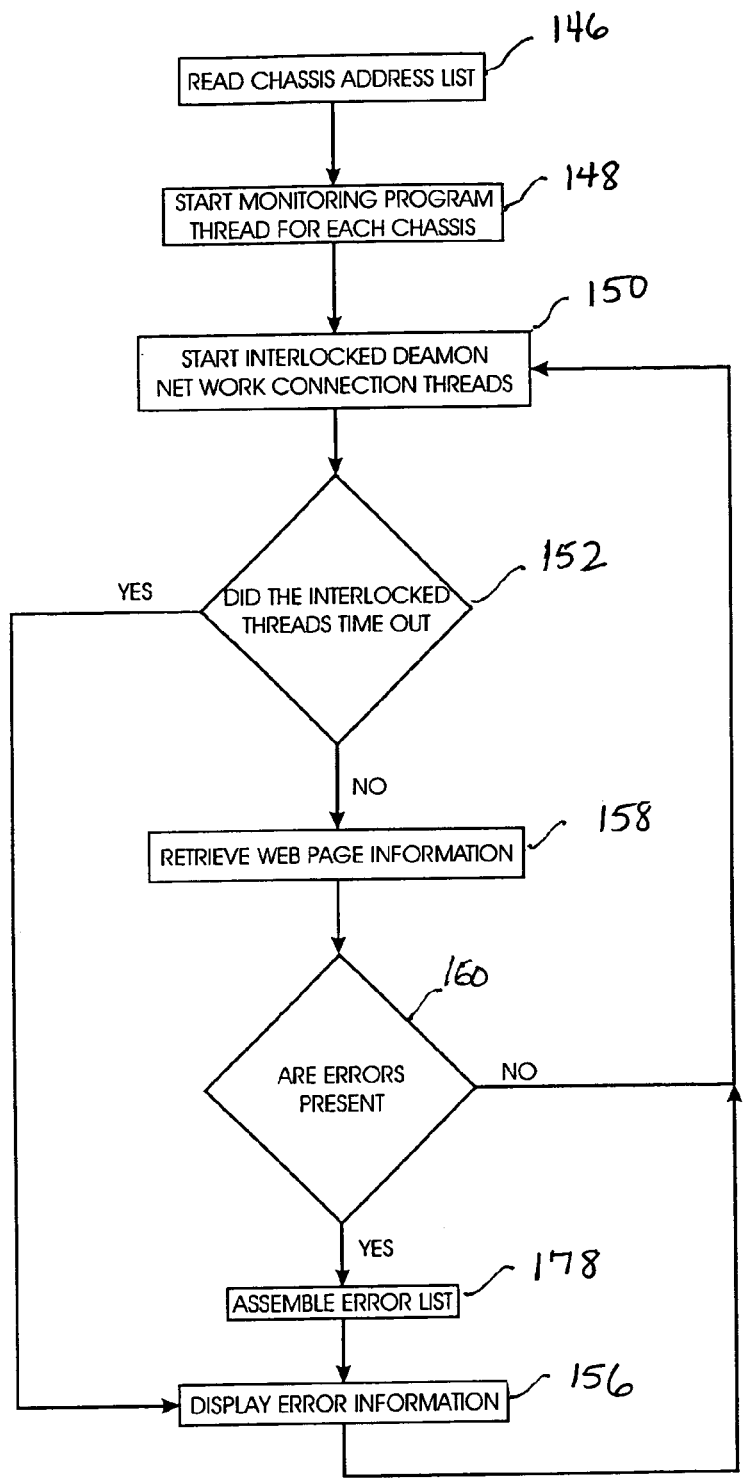
FIG. 7 is a flow chart illustrating the operation of the monitoring program at the monitoring station.

These features are more clearly understood in conjunction with the flow chart in FIG. 7 illustrating the monitoring sequence. As indicated at 146, the monitoring program initially reads the list of IP addresses input by the user. Then, operating in rapid sequence, the program initiates a sequence of primary monitoring program threads or program instruction sets as indicated at 148. Each of the program threads is uniquely and independently associated with a different chassis.

Each of these primary threads incorporates an instruction sequence directed to establishing a connection with its associated chassis, as determined by the associated IP address. In each case, the instructions include a sequence 150 initiating a pair of interlocked secondary threads known as "Deamon" threads. One of the secondary threads is directed toward establishing the chassis connection, through repeated attempts if necessary. The other secondary thread incorporates an instruction sequence designed to count the number of connection attempts. Because the connection attempts occur at regular intervals, counting the number of connection attempts also tracks an elapsed time beginning with the initial connection attempt. The secondary threads incorporate instructions to terminate at 152 if the connection attempt limit (or time limit) is reached before a chassis connection is achieved. The result is an error message confirming a failure to connect with the chassis within the attempt limit or time limit. This result indicates either that the connection to the chassis (e.g. a direct link) is down, or that there is a complete chassis failure. The error indication is displayed on a video display terminal 154 (FIG. 6), as indicated at 156 in FIG. 7.

Returning to location 152 on the flow chart, if the interlocked secondary threads do not time out, i.e. if a chassis connection is established, the chassis status information is retrieved by the monitoring station as indicated at 158. There is a determination at 160, as to whether the chassis status information includes any error indications. In the preferred embodiment, errors are determined at the monitored station or chassis 20-36. In particular, as seen in FIG. 3 for station 20, the monitoring system microcontrollers include memory for storing acceptable parameters, for example maximum temperatures, minimum voltages, and minimum fan speeds. The microcontrollers further are programmed with a comparator function that matches the detected power supply voltage levels, temperatures and fan speeds with their associated stored values. If the measured fan speeds and voltage levels exceed their associated stored values, and if the measured temperatures are less than their associated stored values, no error is reported.

If desired, the memory of each controller can be configured to store values indicating acceptable ranges rather than individual parameters. For example, an acceptable fan rpm range of 2,000-2,400 can be stored to the memory, in lieu of an acceptable minimum fan speed of 2,000 rpm. In general, over-voltage protection in the power supplies and overspeed protection in the fans eliminate the need for setting ranges for these parameters. Special circumstances, e.g. an outdoor chassis location, may call for storing an operating temperature range in lieu of a single maximum acceptable temperature.

Figure 8:
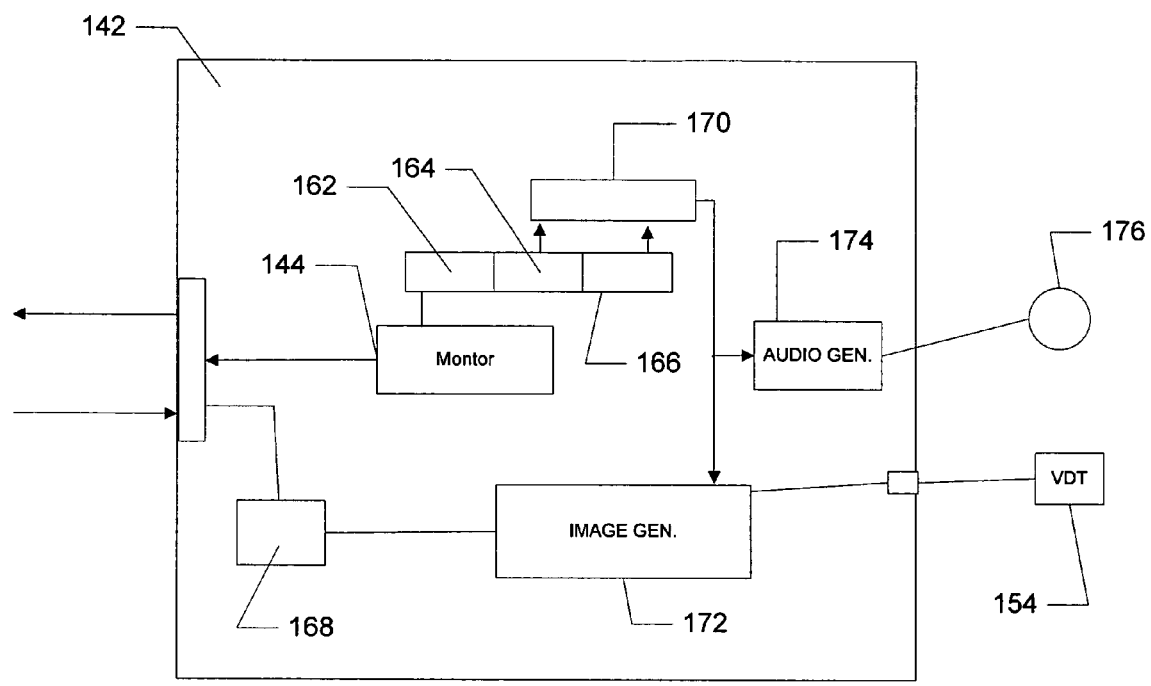
FIG. 8 is a more detailed diagram of the monitoring station of the network shown in FIG. 6.

As an alternative to the preferred approach, memory in computer 18 (or computer 142) at the monitoring station can be configured to store acceptable parameters or parameter ranges for temperatures, voltage levels and fan speeds. The alternative approach is illustrated in FIG. 8, in which computer 142 includes a memory configured to store addresses of monitoring computing stations in a first memory segment or set of registers 162. A second memory segment 164 is provided for dynamically storing condition records. A third memory segment 166 is used to store acceptable values or ranges, in each case to provide an acceptance standard for comparison with an actual condition information entry. The computer memory further includes a set of registers 168 for storing condition records retrieved from the monitored computing stations.

A comparator 170 is coupled to memory segments 164 and 166, and is configured to compare each condition information entry with its associated acceptance standard. If the entry fails to satisfy the standard, comparator 170 generates a fault indication, providing it to an image generator program 172 for display on VDT 154. The fault indication also can be provided to audio signal generation software 174, which in turn triggers a speaker 176 to provide an audio fault indication.

This approach requires each monitored chassis to send all of the parameter information to the monitoring computer, as opposed to information concerning only errors. Also, the preferred approach is more workable in a network that incorporates different types of computers and chassis.

If no errors are indicated, then no display is presented to the user at computer 142, and the monitoring of the particular station is repeated by generating a new pair of interlocked secondary threads. Alternatively, if the query results in one or more error indications, the error indications are assembled into an error list and stored to registers 168 in the memory of computer 142, as indicated at 178 in FIG. 7. Then, as indicated at 156, the error list is retrieved from registers 168 for display on video display terminal 154. Preferably, the display occurs immediately after assembly of the error list, in the form of a "pop-up" window that interrupts any previous display. The warning also may include an audible alarm at speaker 176 and a visible alarm at the video display terminal.

Figure 9:
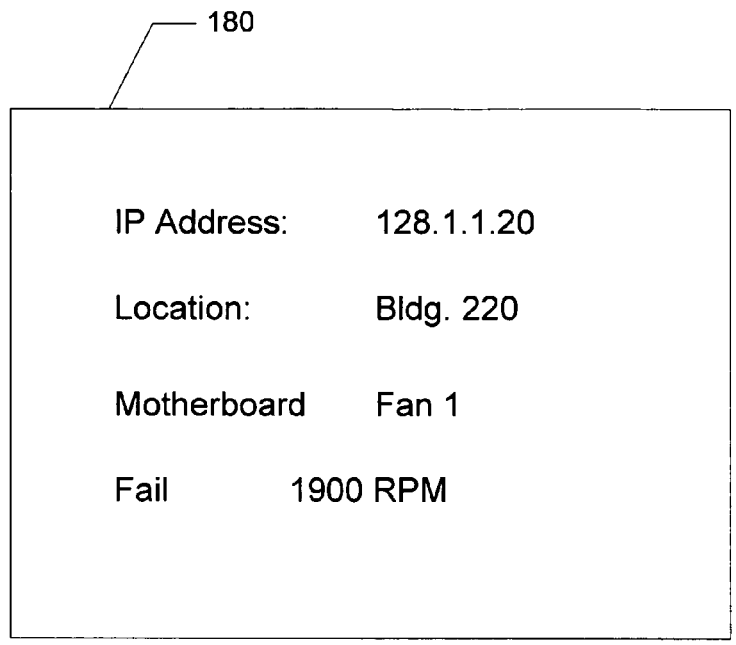
FIG. 9 illustrates a video display generated at the monitoring station in response to an error indication.

An exemplary display is shown at 180 in FIG. 9. The display includes the IP address of the chassis involved, the chassis location, and the list of errors, in this case limited to the failure of one of the motherboard fans. A comparison of FIGS. 5 and 9 reveals the difference in the resulting display at the video display terminal, when stations 20-36 are monitored using monitoring program 144 rather than web browser 54. When the Java program is used, video displays are generated only when errors are indicated, and the displays are limited in a manner that draws attention to the errors. Accordingly, the Java program is particularly well suited for monitoring large scale networks.

Figure 10:
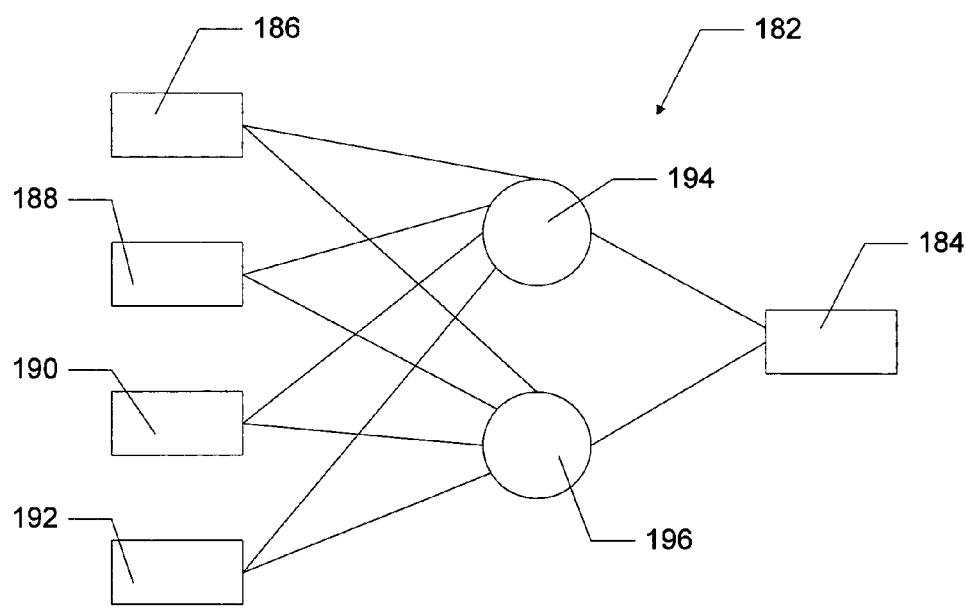
FIG. 10 illustrates an alternative network featuring primary and secondary communication channels for routine operations and monitoring, respectively.

FIG. 10 illustrates a further alternative network 182 in which a monitoring station 184 and a plurality of monitored stations 186-192 are coupled to one another through a primary hub 194 and a secondary hub 196. Each of stations 186-192 is essentially similar to chassis 20-36, having a monitoring system driven by a microcontroller independently of the primary computing function of the chassis. As before, the status information of each chassis is provided to its web engine, and the web engine responds to a query from monitoring computer 184 by generating a web page containing the status information. Monitoring computer 184 is similar to either of computers 18 and 142 in the previous embodiments, incorporating a web browser, a Java program for automatic monitoring, or both.

Hubs 194 and 196 provide two independent network interconnections that couple all of the computing stations and operate simultaneously. Primary hub 194 accommodates transfers of working data and operating programs involved in normal usage of the network. Secondary hub 196 accommodates the transfer of queries, chassis status indications and other information associated with monitoring the network. Whether conducted through a web browser or an automatic monitoring program resident in computer 184, monitoring proceeds as previously explained. The secondary communication channels associated with hub 196 add to the cost of network 182, but allow monitoring to continue, even in the event of a breakdown in the network interconnection associated with primary hub 194. If desired, network 182 can incorporate a redundancy feature to permit transmission of monitoring information over either one of the network interconnections.

According to a further alternative, several computing stations within a given network, or all of the computing stations if desired, can be configured either with web browsers or automatic monitoring programs, so that several or all computing stations in the network are capable of monitoring other computing stations in the network. Further, each computing station of the network can be configured with an independent microcontroller that incorporates the comparator function discussed above in connection with computing station 20, whereby each computing station is capable of monitoring other computing stations, and capable of being monitored by other computing stations.

Thus, the present invention provides for a more reliable monitoring of computers interconnected over a network, particularly in large scale networks involving multiple computers. The system affords the options of monitoring under the direct control of a user at one of the network computers, or automatically in an approach that remains transparent to the user unless a fault is indicated. The program governing automatic monitoring generates fragments individually associated with the monitored computing stations and executable independently of the other fragments, thus to prevent an error indication or delay associated with one chassis from interrupting the monitoring of the other stations on the network.

What is claimed is:

1. A system for monitoring computer component performance at a plurality of computing stations remote from a monitoring station, independent of the operating systems of the monitored computing stations, wherein each computing station includes a primary processor and a chassis housing the primary processor; said system including:

a plurality of detector arrays, each of the arrays located at a different one of a plurality of computing stations, each detector array including at least one detector adapted to continuously sense a computer component performance at the associated computing station and generate a detector signal indicating the then currently sensed performance;

a plurality of controllers, each of the controllers located at an associated one of the computing stations and operatively coupled to the associated detector array to receive the detector signal from each detector of the associated array and generate a computer component performance signal corresponding to each received detector signal;

a plurality of performance information generators, each performance information generator located at an associated one of the computing stations, coupled to receive each associated performance signal, and adapted to generate performance information including a performance information entry based on each received performance signal;

a computing station memory at each computing station adapted to receive the associated current performance information, including a first memory sector for storing address information identifying the associated computing station, and a second memory sector for continuously storing the associated current performance information;

wherein each performance information generator further is adapted to present an immediately retrievable current performance record including the address information and the current performance information for retrieval by a monitoring station, in response to receipt of a cue from the monitoring station;

a monitoring station remote from the computing stations and communicatively coupled to the computing stations, including a monitoring station processor, a selection component for individually selecting different ones of the computing stations, a monitoring component for generating cues and sending the cues to the selected computing stations, and an image generator adapted to generate visible images of the current performance records presented in response to the cues and retrieved by the monitoring station;

wherein the monitoring component comprises computer software in the form of a monitoring program resident in the monitoring station processor, adapted to generate and send cues in accordance with selection input from the selection component;

wherein the monitoring station further includes a memory segment for storing computing station address information comprising a list of addresses identifying the computing stations, and said selection component comprises computer software in the form of a selection program operatively associated with the monitoring program and the first memory segment to select the computing stations from the list of addresses;

the selection program and the monitoring program operate in the background, transparent to a user of the monitoring station processor; and the monitoring station processor is adapted to generate a warning in response to receipt of a performance record including a fault indication.

2. The system of claim 1 wherein:

the monitoring station further includes a video display terminal coupled to the monitoring station processor for displaying images of performance records, and the warning includes a visible image at the video display terminal.

3. The system of claim 1 wherein:

the monitoring station processor further is adapted to generate the warning in response to a failure to retrieve a performance record from one of the computing stations pursuant to a predetermined threshold after sending a cue to said one computing station.

4. A system for monitoring computer component performance at a plurality of computing stations remote from a monitoring station, independent of the operating systems of the monitored computing stations, wherein each computing station includes a primary processor and a chassis housing the primary processor; said system including:

a plurality of detector arrays, each of the arrays located at a different one of a plurality of computing stations, each detector array including at least one detector adapted to continuously sense a computer component performance at the associated computing station and generate a detector signal indicating the then currently sensed performance;

a plurality of controllers, each of the controllers located at an associated one of the computing stations and operatively coupled to the associated detector array to receive the detector signal from each detector of the associated array and generate a computer component performance signal corresponding to each received detector signal;

a plurality of performance information generators, each performance information generator located at an associated one of the computing stations, coupled to receive each associated performance signal, and adapted to generate performance information including a performance information entry based on each received performance signal;

a computing station memory at each computing station adapted to receive the associated current performance information, including a first memory sector for storing address information identifying the associated computing station, and a second memory sector for continuously storing the associated current performance information;

wherein each performance information generator further is adapted to present an immediately retrievable current performance record including the address information and the current performance information for retrieval by a monitoring station, in response to receipt of a cue from the monitoring station;

a monitoring station remote from the computing stations and communicatively coupled to the computing stations, including a monitoring station processor, a selection component for individually selecting different ones of the computing stations, a monitoring component for generating cues and sending the cues to the selected computing stations, and an image generator adapted to generate visible images of the current performance records presented in response to the cues and retrieved by the monitoring station;

an evaluation component for determining, with respect to each of the performance entries, the presence of a fault;

each of the detector arrays includes a plurality of detectors for detecting different performances, and the performance information generated by each performance information generator includes a plurality of performance information entries individually relating to the different performances;

the monitoring station further includes a first memory segment for storing the performance records presented in response to the cues and retrieved by the monitoring station, and a second memory segment for storing acceptance standards individually associated with detected performances; and the evaluation component includes a monitoring station comparator coupled to the first and second memory segments, adapted to individually compare the acceptance standards and the performance information entries, and to generate a fault indication responsive to each failure of a performance information entry to satisfy the corresponding acceptance standard.

5. The system of claim 4 wherein:

the image generator is operably associated with the comparator and thereby adapted to selectively incorporate in said visible images only the performance information entries that include fault indications.

6. A system for monitoring computer component performance at a plurality of computing stations remote from a monitoring station, independent of the operating systems of the monitored computing stations, wherein each computing station includes a primary processor and a chassis housing the primary processor; said system including:
- a plurality of detector arrays, each of the arrays located at a different one of a plurality of computing stations, each detector array including at least one detector adapted to continuously sense a computer component performance at the associated computing station and generate a detector signal indicating the then currently sensed performance;
- a plurality of controllers, each of the controllers located at an associated one of the computing stations and operatively coupled to the associated detector array to receive the detector signal from each detector of the associated array and generate a computer component performance signal corresponding to each received detector signal;
- a plurality of performance information generators, each performance information generator located at an associated one of the computing stations, coupled to receive each associated performance signal, and adapted to generate performance information including
- a performance information entry based on each received performance signal;
- a computing station memory at each computing station adapted to receive the associated current performance information, including a first memory sector for storing address information identifying the associated computing station, and a second memory sector for continuously storing the associated current performance information;

wherein each performance information generator further is adapted to present an immediately retrievable current performance record including the address information and the current performance information for retrieval by a monitoring station, in response to receipt of a cue from the monitoring station;
- a monitoring station remote from the computing stations and communicatively coupled to the computing stations, including a monitoring station processor, a selection component for individually selecting different ones of the computing stations, a monitoring component for generating cues and sending the cues to the selected computing stations, and an image generator adapted to generate visible images of the current performance records presented in response to the cues and retrieved by the monitoring station; and
- each performance information generator comprises a web engine adapted to present the performance record as a web page at the associated computing station.

7. The system of claim 6 wherein:
each web engine comprises a computer program resident in a data storage environment near the associated controller.

8. The system of claim 6 wherein:
each of the performance information generators comprises a computer program resident in a data storage environment near the associated controller, and the first sector of each computer station memory is resident in said data storage environment.

9. The system of claim 6 wherein:
the selection component, the monitoring component and the image generator comprise computer programs resident in the monitoring station processor, and the monitoring station memory includes a plurality of registers resident in the monitoring station processor.

10. A system for monitoring computer component performance at a plurality of computing stations remote from a monitoring station, independent of the operating systems of the monitored computing stations, wherein each computing station includes a primary processor and a chassis housing the primary processor; said system including:
- a plurality of detector arrays, each of the arrays located at a different one of a plurality of computing stations, each detector array including at least one detector adapted to continuously sense a computer component performance at the associated computing station and generate a detector signal indicating the then currently sensed performance;
- a plurality of controllers, each of the controllers located at an associated one of the computing stations and operatively coupled to the associated detector array to receive the detector signal from each detector of the associated array and generate a computer component performance signal corresponding to each received detector signal;
- a plurality of performance information generators, each performance information generator located at an associated one of the computing stations, coupled to receive each associated performance signal, and adapted to generate performance information including a performance information entry based on each received performance signal;
- a computing station memory at each computing station adapted to receive the associated current performance information, including a first memory sector for storing address information identifying the associated computing station, and a second memory sector for continuously storing the associated current performance information;

wherein each performance information generator further is adapted to present an immediately retrievable current performance record including the address information and the current performance information for retrieval by a monitoring station, in response to receipt of a cue from the monitoring station;
- a monitoring station remote from the computing stations and communicatively coupled to the computing stations, including a monitoring station processor, a selection component for individually selecting different ones of the computing stations, a monitoring component for generating cues and sending the cues to the selected computing stations, and an image generator adapted to generate visible images of the current performance records presented in response to the cues and retrieved by the monitoring station;
- the selection component comprises a web browser.

11. A system for monitoring computer component performance at a plurality of computing stations remote from a monitoring station, independent of the operating systems of the monitored computing stations, wherein each computing station includes a primary processor and a chassis housing the primary processor; said system including:
- a plurality of detector arrays, each of the arrays located at a different one of a plurality of computing stations, each detector array including at least one detector adapted to continuously sense a computer component performance at the associated computing station and generate a detector signal indicating the then currently sensed performance;

a plurality of controllers, each of the controllers located at an associated one of the computing stations and operatively coupled to the associated detector array to receive the detector signal from each detector of the associated array and generate a computer component performance signal corresponding to each received detector signal;

a plurality of performance information generators, each performance information generator located at an associated one of the computing stations, coupled to receive each associated performance signal, and adapted to generate performance information including a performance information entry based on each received performance signal;

a computing station memory at each computing station adapted to receive the associated current performance information, including a first memory sector for storing address information identifying the associated computing station, and a second memory sector for continuously storing the associated current performance information;

wherein each performance information generator further is adapted to present an immediately retrievable current performance record including the address information and the current performance information for retrieval by a monitoring station, in response to receipt of a cue from the monitoring station;

a monitoring station remote from the computing stations and communicatively coupled to the computing stations, including a monitoring station processor, a selection component for individually selecting different ones of the computing stations, a monitoring component for generating cues and sending the cues to the selected computing stations, and an image generator adapted to generate visible images of the current performance records presented in response to the cues and retrieved by the monitoring station;

the selection component comprises computer software in the form of a selection program resident in the associated monitoring station processor; and the selection program is written in a universal language and normally operates transparently to a user of the monitoring station processor.

12. A system for monitoring computer component performance at a plurality of computing stations remote from a monitoring station, independent of the operating systems of the monitored computing stations, wherein each computing station includes a primary processor and a chassis housing the primary processor; said system including:

a plurality of detector arrays, each of the arrays located at a different one of a plurality of computing stations, each detector array including at least one detector adapted to continuously sense a computer component performance at the associated computing station and generate a detector signal indicating the then currently sensed performance;

a plurality of controllers, each of the controllers located at an associated one of the computing stations and operatively coupled to the associated detector array to receive the detector signal from each detector of the associated array and generate a computer component performance signal corresponding to each received detector signal;

a plurality of performance information generators, each performance information generator located at an associated one of the computing stations, coupled to receive each associated performance signal, and adapted to generate performance information including a performance information entry based on each received performance signal;

a computing station memory at each computing station adapted to receive the associated current performance information, including a first memory sector for storing address information identifying the associated computing station, and a second memory sector for continuously storing the associated current performance information;

wherein each performance information generator further is adapted to present an immediately retrievable current performance record including the address information and the current performance information for retrieval by a monitoring station, in response to receipt of a cue from the monitoring station;

a monitoring station remote from the computing stations and communicatively coupled to the computing stations, including a monitoring station processor, a selection component for individually selecting different ones of the computing stations, a monitoring component for generating cues and sending the cues to the selected computing stations, and an image generator adapted to generate visible images of the current performance records presented in response to the cues and retrieved by the monitoring station;

a set of primary data transmission pathways adapted to accommodate transmission of working data and operating programs between the monitoring station and the computing stations; and a set of secondary data transmission pathways adapted to accommodate transmission of performance monitoring data including the cues and performance records between the monitoring station and the computing stations.

13. The system of claim 12 wherein:
the primary data transmission pathways include a first carrier frequency bandwidth to accommodate wireless transmissions of working data and operating programs, and the secondary data transmission pathways include a second carrier frequency bandwidth to accommodate wireless transmissions of the performance monitoring data.

14. The system for monitoring computer component performance of claim 12 wherein each performance information generator comprises a web engine adapted to present the performance record as a web page at the associated computing station.

15. The system for monitoring computer component performance of claim 12 wherein the selection component comprises a web browser.

16. In a network of computing stations, a monitoring station for tracking in real time current computer component performances at the other computing stations in the network, independent of the operating systems of the monitored computing stations, said monitoring station including:

a monitoring station processor;

a selector for determining a set of remote computing stations to be monitored from a monitoring station that includes the monitoring station processor, a monitoring component operably associated with the selector and adapted to send cues in a sequence to the selected remote computing stations, thereby to cause a performance information generator located at each selected computing station to generate a performance record including computing station address information and computer component performance information indicating at least one currently sensed performance at the computing station, and to present the current performance record for retrieval by the monitoring station, said monitoring component being further adapted to retrieve the current performance records presented by the computing stations; and a monitoring station memory including a first memory segment for storing a list of addresses individually identifying the remote computing stations;

wherein the monitoring station processor is adapted to generate a warning in response to receiving a computer component current performance record with a fault indication; and wherein the monitoring component and the selector are configured to operate transparently to a user of the monitoring station processor until said processor generates a warning.

17. The monitoring station of claim 16 further including:
an image generator associated with the monitoring station memory, for generating visible images of the retrieved performance records, and a video display terminal operably coupled to the image generator and adapted to display the visible images, wherein the warning includes a visible image at the video display terminal.

18. The monitoring station of claim 17 wherein:
each of the performance records includes a plurality of performance information entries relating to different performances sensed at the associated remote computing station, and the monitoring station incorporates an evaluation component for determining the presence of a fault with respect to each of the performance information entries.

19. The monitoring station of claim 18 wherein:
the monitoring station memory includes a second memory segment for storing retrieved performance records, and a third memory segment for storing acceptance standards individually associated with the detected performances; and the evaluation component includes a monitoring station comparator coupled to the second and third memory segments, adapted to individually compare the acceptance standards and the performance information entries, and to generate a fault indication responsive to each failure of a performance information entry to satisfy the corresponding acceptance standard.

20. The monitoring station of claim 19 wherein:
the image generator is operably associated with the comparator and thereby adapted to selectively incorporate in said visible images only the performance information entries that include fault indications.

21. The monitoring station of claim 17 wherein:
the selector, the monitoring component and the image generator comprise computer programs resident in the monitoring station processor, and the monitoring station memory includes a plurality of registers resident in the monitoring station processor.

22. The monitoring station of claim 21 wherein: the selector and the monitoring component are written in a universal language.

23. The monitoring station of claim 16 wherein:
the monitoring component is adapted to send the cues in multiple repetitions of said sequence, and the monitoring station includes a second memory segment adapted to continuously store the current performance records retrieved by the monitoring component to thereby contain the current performance records related to a most current repetition of the sequence.

24. The monitoring station of claim 16 wherein:
the monitoring component comprises computer software in the form of a monitoring program resident in the monitoring station processor, adapted to generate and send the cues in accordance with input from the selection component.

25. The monitoring station of claim 24 wherein:
the selector comprises an operator-controlled device linked to the monitoring station processor and configured to allow a system user to control said input.

26. The system of claim 24 wherein:
the selector comprises computer software in the form of a selection program operably associated with the monitoring program and the first memory segment.

27. The monitoring station of claim 16 wherein:
each of the performance records retrieved from one of the remote computing stations includes a plurality of performance information entries relating to different performances at the remote computing station.

28. The monitoring station of claim 16 wherein:
the monitoring station processor further is adapted to generate the warning in response to a failure to retrieve a performance record from one of the computing stations pursuant to a predetermined threshold after sending a cue to said one computing station.

29. A real time self monitoring computing station, including:
a primary processor disposed at a computing station;
a detector array at the computing station, including at least one detector adapted to continuously sense a current computer component performance at the computing station and generate a detector signal indicating the sensed performance;
a controller coupled to receive the detector signal from each detector of the array, and adapted to generate a computer component performance signal corresponding to each detector signal;
a performance information generator coupled to receive each performance signal and adapted to generate performance information including a performance information entry based on each received performance signal;
a memory at the computing station including a first memory sector for storing address information identifying the computing station, a second memory sector for dynamically storing the then current performance information, and a third memory sector for storing an acceptance standard corresponding to each performance information entry;
a comparator coupled to the second and third memory sectors, adapted to compare each the then performance information entry with its corresponding acceptance standard and generate a fault indication responsive to each failure of a performance information entry to satisfy the corresponding acceptance standard;
wherein the performance information generator further is adapted to present a performance record including the address information and the performance information for retrieval by a remote monitoring station, independent of the operating system of the monitored computing station, in response to receiving a cue from the monitoring station;
the detector array includes a plurality of detectors for detecting different performances, and the performance information includes a plurality of performance information entries individually related to the different performances;

the performance information generator is operably coupled with the comparator and thereby is adapted to selectively incorporate in the performance record only the performance information entries that include fault indications.

30. A real time self monitoring computing station, including:
a primary processor disposed at a computing station;
a detector array at the computing station, including at least one detector adapted to continuously sense a current computer component performance at the computing station and generate a detector signal indicating the sensed performance;
a controller coupled to receive the detector signal from each detector of the array, and adapted to generate a computer component performance signal corresponding to each detector signal;
a performance information generator coupled to receive each performance signal and adapted to generate performance information including a performance information entry based on each received performance signal;
a memory at the computing station including a first memory sector for storing address information identifying the computing station, a second memory sector for dynamically storing the then current performance information, and a third memory sector for storing an acceptance standard corresponding to each performance information entry;
a comparator coupled to the second and third memory sectors, adapted to compare each the then performance information entry with its corresponding acceptance standard and generate a fault indication responsive to each failure of a performance information entry to satisfy the corresponding acceptance standard;
wherein the performance information generator further is adapted to present a performance record including the address information and the performance information for retrieval by a remote monitoring station, independent of the operating system of the monitored computing station, in response to receiving a cue from the monitoring station; and
the performance information generator comprises a web engine adapted to present the performance record as a web page at the computing station.

31. The computing station of claim 30 wherein:
the web engine comprises a computer program contained in a data storage environment near the controller.

32. A process for monitoring in real time current computer component performances at a plurality of remote computing stations, independent of the operating systems of the monitored computing stations, including:
providing a detector array at each of a plurality of remote computing stations, and using each detector of each array to continuously sense a current computer component performance at the associated station;
using a controller at each station to receive a detector signal from each detector of the associated array, and to generate a performance signal corresponding to each detector signal;
generating performance information at each computer station including a performance information entry corresponding to each performance signal;
assembling the performance information at each station, along with address information identifying that station, into a performance record associated with that station;
sending a cuing signal from a monitoring computer to each of the remote computing stations;
responsive to receiving the cuing signal at each remote station, presenting the current performance record associated with that station for retrieval by the monitoring computer;
using the monitoring computer to retrieve the presented current performance records;
entering a list of the remote computing stations into the monitoring computer,
entering a list of remote computing stations into the monitoring computer;
causing the computer to send the cuing signals in a sequence to the remote computing stations on the list;
using a computer program resident in the monitoring computer to cause multiple repetitions of said sequence; and
using the computer program includes generating a pair of interlocked instruction sets, each pair being uniquely and independently associated with a different one of the remote computing stations, wherein a first instruction set of each' said pair is directed to establishing a connection with the associated remote station to provide the cuing signal to that station, and a second instruction set of each said pair is directed to setting a threshold for establishing the connection, and generating a failure indication if the connection is not established pursuant to the threshold.

33. A process for monitoring in real time current computer component performances at a plurality of remote computing stations, independent of the operating systems of the monitored computing stations, including:
providing a detector array at each of a plurality of remote computing stations, and using each detector of each array to continuously sense a current computer component performance at the associated station;
using a controller at each station to receive a detector signal from each detector of the associated array, and to generate a performance signal corresponding to each detector signal;
generating performance information at each computer station including a performance information entry corresponding to each performance signal;
assembling the performance information at each station, along with address information identifying that station, into a performance record associated with that station;
sending a cuing signal from a monitoring computer to each of the remote computing stations;
responsive to receiving the cuing signal at each remote station, presenting the current performance record associated with that station for retrieval by the monitoring computer;
using the monitoring computer to retrieve the presented current performance records;
wherein each detector array includes a plurality of detectors, whereby the performance information associated with each remote computing station includes a plurality of performance information entries;
maintaining a list of acceptance standards associated with each remote computing station, comparing the acceptance standards with the associated performance information entries in a one-to-one correspondence, and generating a fault indication responsive to each failure of a performance information entry to satisfy the associated acceptance standard; and
comparing the acceptance standards with the associated performance information entries is performed at the monitoring computer.

34. A process for monitoring in real time current computer component performances at a plurality of remote computing stations, independent of the operating systems of the monitored computing stations, including:

providing a detector array at each of a plurality of remote computing stations, and using each detector of each array to continuously sense a current computer component performance at the associated station;

using a controller at each station to receive a detector signal from each detector of the associated array, and to generate a performance signal corresponding to each detector signal;

generating performance information at each computer station including a performance information entry corresponding to each performance signal;

assembling the performance information at each station, along with address information identifying that station, into a performance record associated with that station;

sending a cuing signal from a monitoring computer to each of the remote computing stations;

responsive to receiving the cuing signal at each remote station, presenting the current performance record associated with that station for retrieval by the monitoring computer;

using the monitoring computer to retrieve the presented current performance records;

wherein each detector array includes a plurality of detectors, whereby the performance information associated with each remote computing station includes a plurality of performance information entries;

maintaining a list of acceptance standards associated with each remote computing station, comparing the acceptance standards with the associated performance information entries in a one-to-one correspondence, and generating a fault indication responsive to each failure of a performance information entry to satisfy the associated acceptance standard;

generating visible images of the retrieved performance records; selectively generating, with respect to each retrieved performance record, visible images of only the performance information entries that include fault indications.

35. A process for monitoring in real time current computer component performances at a plurality of remote computing stations, independent of the operating systems of the monitored computing stations, including:

providing a detector array at each of a plurality of remote computing stations, and using each detector of each array to continuously sense a current computer component performance at the associated station;

using a controller at each station to receive a detector signal from each detector of the associated array, and to generate a performance signal corresponding to each detector signal;

generating performance information at each computer station including a performance information entry corresponding to each performance signal;

assembling the performance information at each station, along with address information identifying that station, into a performance record associated with that station;

sending a cuing signal from a monitoring computer to each of the remote computing stations;

responsive to receiving the cuing signal at each remote station, presenting the current performance record associated with that station for retrieval by the monitoring computer;

using the monitoring computer to retrieve the presented current performance records; and generating a fault indication at the monitoring computer in response to a failure to retrieve a performance record from one of the remote computing stations pursuant to a predetermined threshold after sending a cuing signal to said one remote computing station.

\* \* \* \* \*